June 23, 1931.  G. LOENING  1,811,510
HANDLING CARRIAGE FOR STOWING AIRRLANES
Filed Nov. 7, 1930
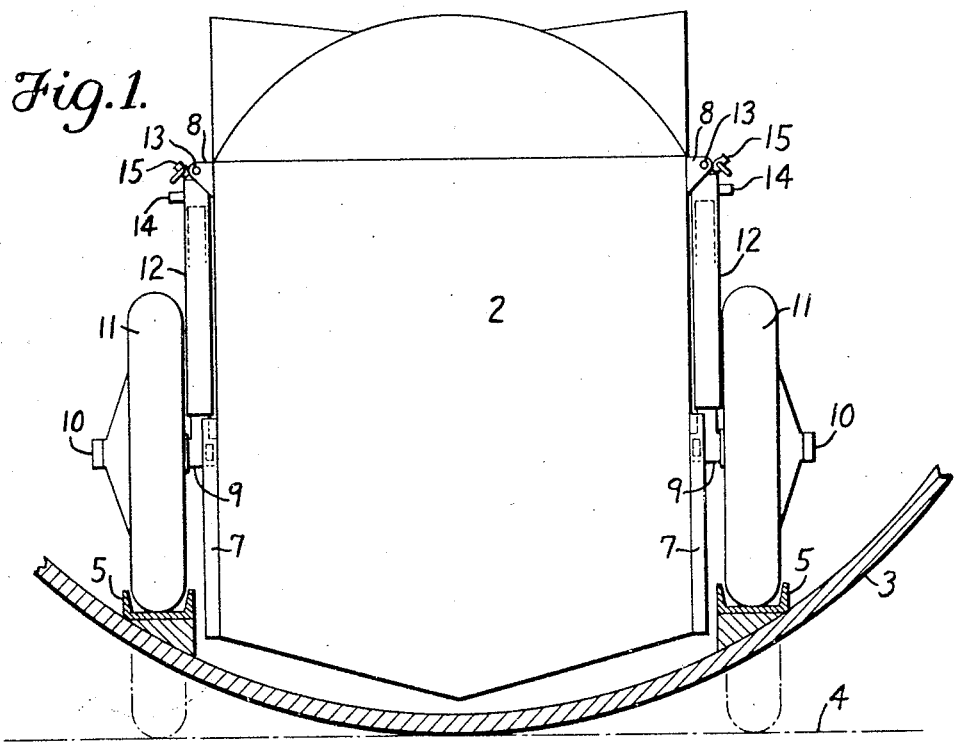
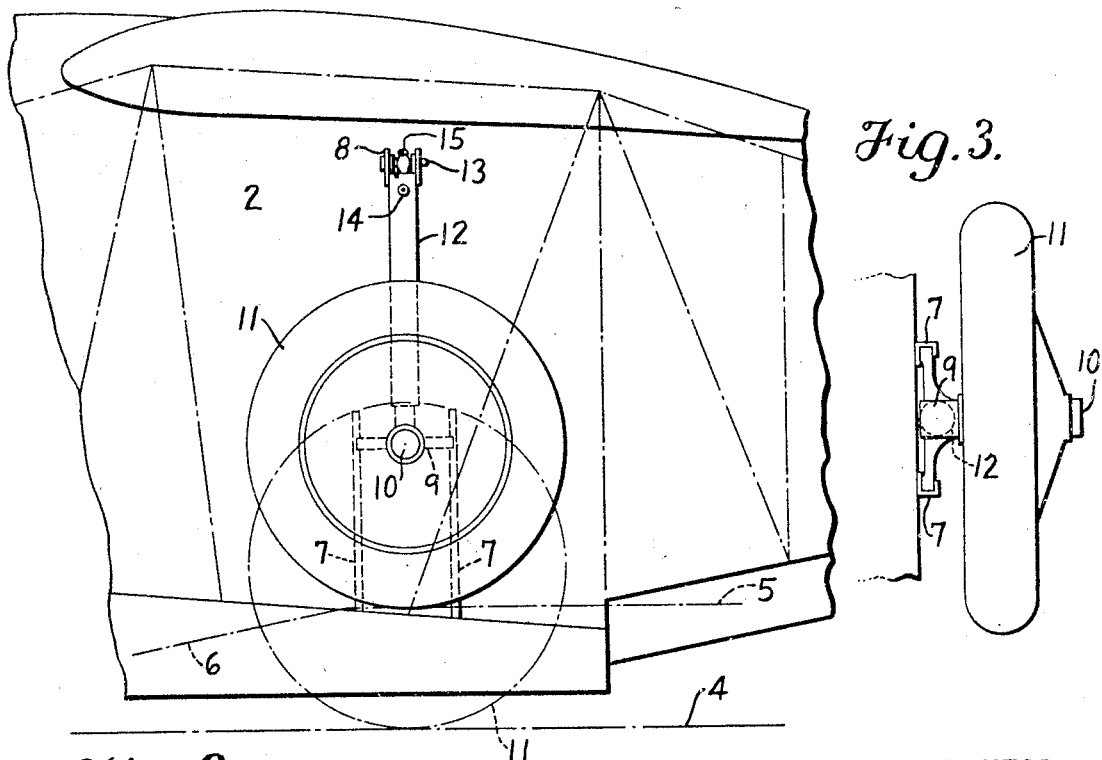
INVENTOR
Grover Loening
BY
J. H. Leuderberg
ATTORNEY Patented June 23, 1931

1,811,510

UNITED STATES PATENT OFFICE

GROVER LOENING, OF NEW YORK, N. Y.

HANDLING CARRIAGE FOR STOWING AIRPLANES

Application filed November 7, 1930. Serial No. 493,942.

This invention is a handling carriage for stowing flying-boats or other airplanes in confined spaces. The invention is more particularly designed to provide convenient means for introducing an airplane body into a cylindrical tank carried by a submarine, and for withdrawing it from the tank onto the deck.

The carriage of this invention has a pair of wheels which are applicable close to the sides of the body of the airplane and which are caused or permitted to rise relatively to the body when the wheels are rolled within the tank, and are depressed relatively to the body when they are rolled on a flat surface.

In the case of a tank or other berth having a curved bottom or walls which slope up from the bottom line of the berth, wheels positioned to project below the bottom of the body so that the body can be rolled on deck would rest so high on the sloping sides of the bottom of the tank that the bottom of the body would be raised considerably away from the bottom of the tank. Thus, the body could not be introduced with such wheels alone into a tank of minimum height. For this reason the present stowing carriage is so constructed that the wheels can be depressed to project below the bottom line of the body when the body is to be wheeled on a substantially flat surface and can be elevated to enable the body to be rolled into or out of a troughed surface, such as the bottom of a cylindrical tank, with the bottom of the body just clearing the bottom of the tank. The devices for adjusting the height of the wheels are of such character as to sustain the wheels on the body against upward thrust at either extreme adjustment or at any position in between.

Inclined tracks will usually be used for guiding the wheels from the deck level to the level of the lines where the wheels will rest on the upwardly sloping surfaces of the tank or berth, or on horizontal tracks fixed in the tank. The wheel adjusting and sustaining devices can be operated to elevate the wheels gradually relatively to the body as the wheels pass up the inclined tracks and to depress them gradually as the wheels roll down these tracks, or the adjustment can be made more or less at one time. Thus, the body can be pushed up an incline while the wheels remain depressed, and the wheels can be elevated in order to lower the body as it is about to be entered into the tank; and conversely the body can be lowered down the incline with the wheels raised, and when or just before the bottom of the body touches the deck the wheels can be depressed so as to raise the body.

Fluid-pressure cylinders, and more especially pneumatic cylinders in the nature of struts, constitute the most desirable means for depressing and raising the wheels relatively to the body and for sustaining them in any position, but other means may be employed. These cylinders have connections to receive air hose, and valves for admitting air to the cylinders, for allowing air to escape in a controllable manner and for confining air in the cylinders.

The carriage is composed of two parts which are quickly attachable to and detachable from the sides of the body. In the preferred construction each part of the carriage comprises a wheel-carrier adapted to be guided in and to be removable from a vertical guide on the side of the body, together with one of the pneumatic cylinder struts connected at its lower end with the wheel-carrier and having a detachable connection at its upper end with a socket or bracket on the body.

In the accompanying drawings, forming part hereof:

Fig. 1 is an end view of the flotation body of a flying-boat with the handling carriage applied thereto. The wheels are shown in their elevated positions resting on tracks supported on the upwardly sloping sides of the bottom of a tank, these tracks and the portion of the tank which is shown being in section. The deck level is indicated, and dot-and-dash lines show the depressed positions of the wheels when they rest on this level.

Fig. 2 is a fragmentary side elevation of the airplane body and one-half of the handling carriage. The deck line is indicated as before and the depressed position of the wheel is again shown in dot-and-dash lines.

The horizontal and inclined portions of the track are indicated by similar lines.

Fig. 3 is a bottom plan view showing one of the wheel-carriers guided in its guide on the side of the body.

The drawings indicate the hull or boat body 2 of a flying-boat, but the invention is applicable to the bodies of other types of heavier-than-air flying machines. It will be understood that the wings are removed from the body and are stowed separately in the cylindrical tank 3, the lower portion only of which is shown in Fig. 1. This tank may be understood as being fixed to the deck 4 of a submarine. Tracks 5 may be fixed longitudinally inside the tank, these tracks being disposed at some distance up the slopes of the tank shell which rise in opposite directions from the bottom line of the tank, and external inclined tracks are preferably placed to lead from the deck line to the ends of the horizontal tracks, or to the positions which they occupy. The dot-and-dash lines 5, 6 in Fig. 2 indicate such horizontal and inclined tracks.

On each side of the body, approximately amidships, a vertical guide is permanently fixed. These guides are disposed on the lower portions of the sides, and a very simple construction is the one illustrated in which each guide consists of two channels 7 secured to the body in spaced relation with their channels facing each other. Above each of these guides, near the top of the body, a simple form of socket or attachment bracket is fixed to the side of the body or hull, this attachment bracket consisting preferably of a pair of small perforated lugs 8.

Each detachable half of the handling carriage includes a simple form of wheel-carrier 9 adapted to lie close to the side of the hull, this carrier having a short axle 10 projecting from it to receive a wheel 11. This wheel-carrier can be inserted in and removed from one of the guides 7, 7, within which it can move up or down but in no other direction. The remainder of each half of the handling carriage preferably consists of a long, narrow pneumatic cylinder 12 and its piston. The lower end of this strut, that is to say, the piston, is connected to the carrier, and the upper end of the cylinder has perforated ears for detachable connection with the bracket lugs 8, this being conveniently effected by the insertion of a removable pin 13.

Each cylinder 12 has a connection 14 to receive an air hose, this connection being preferably provided with a standard tire valve to permit the air to enter and to hold it in the cylinder. A relief valve 15 having a handle for manual operation enables air to be vented from the cylinder in a controllable manner.

In this way the wheels can be depressed relatively to the body by admitting more or less air to the cylinders, and the wheels can be permitted or caused to rise by allowing more or less air to escape. With the relief valves closed the wheels are sustained against upward reaction at any degree of adjustment, and it is easy to manipulate the relief valves so as to permit the wheels to rise gradually if that is desired.

I realize that numerous changes may be made in the carrying out of the invention and that various equivalents for the devices which have been described may be employed, and it is desired, therefore, that the drawings and the foregoing description should be understood as being illustrative of a preferred embodiment and not as limiting the scope of the invention set forth in the appended claims.

I claim:

1. A handling carriage for stowing airplane bodies, comprising wheels and wheel-carriers disposable adjacent the sides of the body of the airplane, means for detachably connecting the wheel-carriers with the body, and means controlling vertical movement of the wheels relatively to the body so that in an elevated position the wheels will support the body in a curved berth and in a depressed position they will support it on a flat surface, said means adapted to sustain the load on the wheels throughout the range of vertical movement.

2. A handling carriage for stowing airplane bodies, comprising, in combination with vertical guides on the sides of the body and attachment brackets also on the body above the guides, two units each of which comprises a wheel disposable adjacent a side of the body, a wheel-carrier detachably engageable with one of said guides, a strut adapted to extend upward from the wheel-carrier and to be detachably connected to one of said brackets, and means for operating said strut so that the wheel can be depressed to roll on a level surface or elevated to roll within a tank.

3. Handling means for stowing airplane bodies, comprising wheels disposable at the sides of the airplane body, wheel-carriers, guides for detachably connecting said wheel-carriers with the body and for guiding them vertically close to the sides of the body, fluid-pressure cylinders adapted to be detachably connected with the body to sustain said wheel-carriers against upward reaction, and means for supplying pressure fluid to said cylinders and for permitting its escape therefrom in a manner to adjust the wheels up or down relatively to the body so that the body can be rolled into and out of a tank from and to a level surface.

GROVER LOENING.